US012070431B2

(12) United States Patent
Thomas et al.

(10) Patent No.: US 12,070,431 B2
(45) **Date of Patent: *Aug. 27, 2024**

(54) PATIENT TURNER-PULLER AND ATTACHMENTS

(71) Applicants: Mammen Thomas, Seattle, WA (US); Sarah Peter, Los Angeles, CA (US); Elizabeth Thomas, Seattle, WA (US)

(72) Inventors: Mammen Thomas, Seattle, WA (US); Sarah Peter, Los Angeles, CA (US); Elizabeth Thomas, Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/141,951

(22) Filed: May 1, 2023

(65) Prior Publication Data

US 2023/0263680 A1 Aug. 24, 2023

Related U.S. Application Data

(63) Continuation of application No. 17/984,000, filed on Nov. 9, 2022, now Pat. No. 11,883,341, which is a continuation of application No. 17/017,577, filed on Sep. 10, 2020, now Pat. No. 11,529,277.

(51) Int. Cl.
*A61G 7/10* (2006.01)

(52) U.S. Cl.
CPC ......... *A61G 7/1057* (2013.01); *A61G 7/1015* (2013.01); *A61G 7/1023* (2013.01); *A61G 7/1026* (2013.01); *A61G 2200/32* (2013.01); *A61G 2203/10* (2013.01)

(58) Field of Classification Search
CPC .. A61G 7/1057; A61G 7/1015; A61G 7/1023; A61G 7/1026; A61G 2200/32; A61G 2200/10
USPC .................................................... 5/88.1, 89.1
See application file for complete search history.

(56) References Cited

U.S. PATENT DOCUMENTS 3,597,774 A * 8/1971 Warren ................ A61G 7/1026 5/84.1
3,829,914 A * 8/1974 Treat ...................... A47C 21/00 5/81.1 T
4,747,170 A * 5/1988 Knouse ................ A61G 7/1026 5/81.1 HS
5,168,587 A * 12/1992 Shutes .................. A61G 7/001 5/88.1
7,293,303 B2 * 11/2007 Worrell ................ A61G 7/1032 5/81.1 R (Continued)

FOREIGN PATENT DOCUMENTS

GB 2311001 A * 9/1997 ........... A61G 7/1026

*Primary Examiner* — David R Hare

(57) ABSTRACT

The system uses a motor, and a rolling tube or rod of sufficient strength to apply a pull force on one side of a sheet on the bed with the patient lying on the sheet to help pull up the patient on his bed or turn patients on his side with little manual effort. The sheet used has an underside which is slidable to reduce the friction and having a plurality of loops on the sides to connect to the pull straps. The loops to which the pull straps are connected are chosen to apply equal force to pull or turn the patient on the sheet. Patients having mobility issues have to be routinely pulled up or turned on their sides to make them comfortable and avoid formation of bed sores. These operations have caused back problems for many caregivers. The system disclosed provides mechanized help for these operations.

13 Claims, 7 Drawing Sheets

(56) References Cited

U.S. PATENT DOCUMENTS

Figure 1:
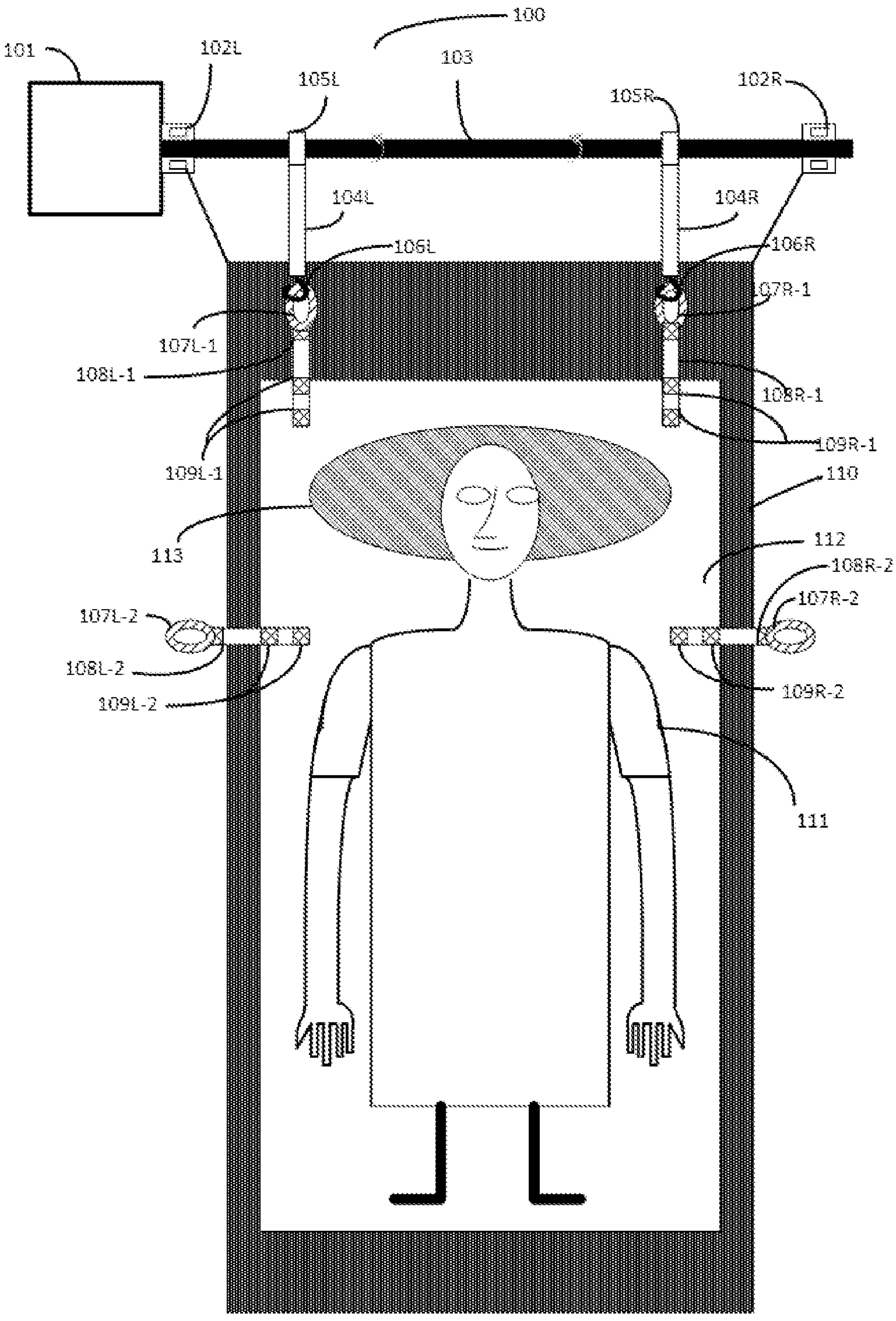

| | | | | |
|---|---|---|---|---|
| 7,480,949 | B2 * | 1/2009 | Bloomquist | A61G 7/1046 5/81.1 HS |
| 7,725,964 | B2 * | 6/2010 | Minning | A61G 7/1025 5/81.1 R |
| 8,710,950 | B2 * | 4/2014 | Lubbers | A61G 7/0506 340/13.24 |
| 9,192,535 | B2 * | 11/2015 | Sverdlik | A61G 7/1044 |
| 9,320,667 | B2 * | 4/2016 | Tilk | A61G 7/1036 |
| 11,324,650 | B2 * | 5/2022 | Zhou | A61G 7/1032 |
| 11,478,390 | B2 * | 10/2022 | Thomas | A61G 7/1015 |
| 11,529,277 | B2 * | 12/2022 | Thomas | A61G 7/1026 |
| 2002/0029418 | A1 * | 3/2002 | Votel | A61G 7/1048 5/81.1 RP |
| 2002/0083522 | A1 * | 7/2002 | Sverdlik | A61G 7/1055 5/81.1 R |
| 2003/0074732 | A1 * | 4/2003 | Hanson | A61G 7/08 5/81.1 R |
| 2005/0150045 | A1 * | 7/2005 | Lloyd | A61G 7/1026 5/81.1 R |
| 2006/0273292 | A1 * | 12/2006 | Milam | B66D 3/20 254/343 |
| 2009/0017819 | A1 | 1/2009 | Fox et al. | |
| 2009/0178193 | A1 * | 7/2009 | Jewell | A61G 7/1026 5/81.1 HS |
| 2010/0023598 | A9 | 9/2010 | Klyne et al. | |
| 2010/0235986 | A1 * | 9/2010 | Klyne | A61G 7/1026 5/81.1 R |
| 2013/0025048 | A1 * | 1/2013 | Pruett | A61G 7/1026 5/81.1 HS |
| 2014/0352058 | A1 * | 12/2014 | Sverdlik | A61G 7/1044 5/81.1 HS |
| 2016/0331617 | A1 * | 11/2016 | Stryker | A61G 7/0524 |

* cited by examiner

Note: The rotation of the motor reverses when the polarity at the terminals are changed, from pull to relese

PATIENT TURNER-PULLER AND ATTACHMENTS

PRIOR APPLICATION DETAILS

This application titled: Patient Puller-Turner is a continuation application of U.S. application Ser. No. 17/984,000 filed on Nov. 9, 2022 and having a confirmation number 8254 titled: Patient Turner-Puller which is a Continuation application of U.S. application Ser. No. 17/710,732 filed on Mar. 31, 2022, having a confirmation number 5965, and a docket number MSE-002 titled: Patient Puller, currently issued as a U.S. Pat. No. 11,478,390 which is a divisional application of Ser. No. 17/017,577 filed on Sep. 10, 2020 having a confirmation number 5087. Titled: Patient Puller having a docket number MSE-001, currently issued as a U.S. Pat. No. 11,529,277.

BACKGROUND SHOWING NEED FOR THE INVENTIVE IDEA

Hospitals and care facilities taking care of invalids and sick patients with limited mobility face a few common problem that seems to be simple but create major difficulty for the nursing staff. This is the activity of moving up patients who have a tendency to slide down beds and turning the patient to make them comfortable and prevent bed sores. This is especially true for mechanical beds that have the capability for raising different portions to make the patients comfortable. When a patient slides down, it makes the adjustment of the bed and turning uncomfortable for the patients. The patients have to be moved-up to make the adjustment capability operate in an efficient fashion to make the patient comfortable. It is also necessary to turn the patient on the bed in a comfortable way. Since the patient turning-operation is a problematic one for the care givers, this application, without being limiting, will focus mainly on that activity.

In most institutions and care facilities moving the patient up the bed and turning the patient are requirements and are done very frequently to make the patient comfortable. Currently this activity is done manually resulting in possible injury to the care givers involved. Typically, the pull-up operation is done by two nursing staff one on either side of the bed, placing the patient on a slide sheet and pulling the patient manually up using the slide sheet. Similarly, the patient turning operation requires more than one care giver to be accomplished. These simple but strenuous operations have been the cause of back problems for many of the nursing staff. There has been a lot of teaching on how to correctly move and turn patients on their beds, without getting hurt, but injuries are still a very real problem that has not been addressed fully. That is one of the problems addressed by this application.

It will hence be useful to have a way to pull-up or slide up a patient lying horizontally or at a slight angle on a bed, to make his lying position more comfortable, and also to turn the patient on his bed preferably without the involvement of multiple care givers and without fear of injury to the care giver(s) doing the work. This is especially true in these critical time of Covid-19 when there is already a dearth of trained medical staff and care givers.

Problem Solution

The problem addressed in this application addresses the need to turn the patient on his bed. A mechanism using a motor, and a rolling tube or rod of sufficient strength to apply a pull force on one side of a sheet on the bed with the patient lying on the sheet is provided to help turn patients on his side with little manual effort. Patients having mobility issues under care in homes, nursing-homes or hospitals have to be turned on their sides often to reduce formation of bed sores among other reasons. Currently this is done manually by nurses or caregivers turning the patient by pulling up on one side of the sheet to turn the patient on his side. This simple but strenuous operation has been the cause of back problems for many caregivers. The current invention is a way to reduce or eliminate this injury to caregivers by providing a mechanized help for the patient turning operation.

A mechanism using a motor, and a rolling tube or rod of sufficient strength to apply a pull force on one side of a sheet on the bed with the patient lying on the sheet is provided to help turn patients on his side with little manual effort. Patients having mobility issues under care in homes, nursing-homes or hospitals have to be turned on their sides often to reduce formation of bed sores among other reasons. Currently this is done manually by nurses or caregivers turning the patient by pulling up on one side of the sheet to turn the patient on his side. This simple but strenuous operation has been the cause of back problems for many caregivers. The current invention is a way to reduce or eliminate this injury to caregivers by providing a mechanized help for the patient turning operation.

The system described uses a motor, and a rolling tube or rod of sufficient strength to apply a pull force on one side of a sheet on the bed with the patient lying on the sheet to help pull up the patient on his bed or turn patients on his side with little manual effort. The sheet used has an underside which is slidable to reduce the friction and having a plurality of loops on the sides to connect to the pull straps. The loops to which the pull straps are connected are chosen to apply equal force to pull or turn the patient on the sheet. Patients having mobility issues have to be routinely pulled up or turned on their sides to make them comfortable and avoid formation of bed sores. These operations have caused back problems for many caregivers. The system disclosed provides mechanized help for these operations.

DESCRIPTION OF FIGURES AND PICTURES

FIG. 1—is a block diagram of the patient puller 100 comprising a motorized unit with electrical switches and a pull-rod and preferably releasable pull straps as per a preferred embodiment.

Figure 1A:
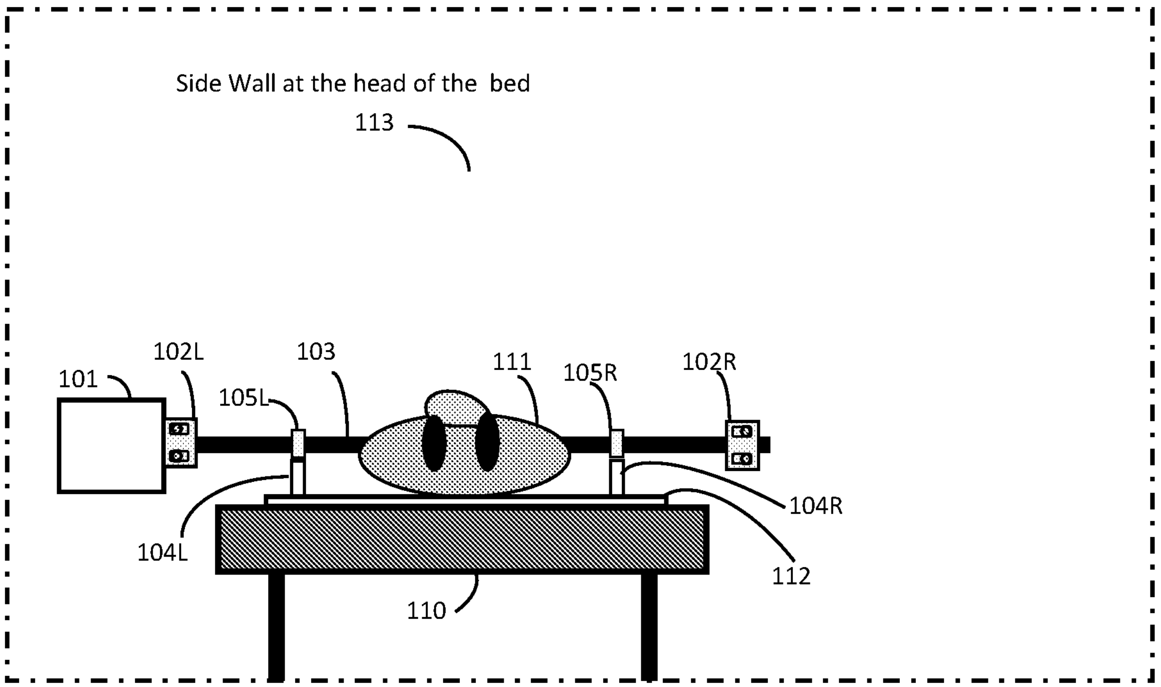

FIG. 1A—is an embodiment of the patient puller motorized unit and the rotating pull rod are fixed to the side wall at the head of the bed instead of being attached to the bed itself to move the patient up horizontally on his bed when the patient puller is turned on.

Figure 1B:
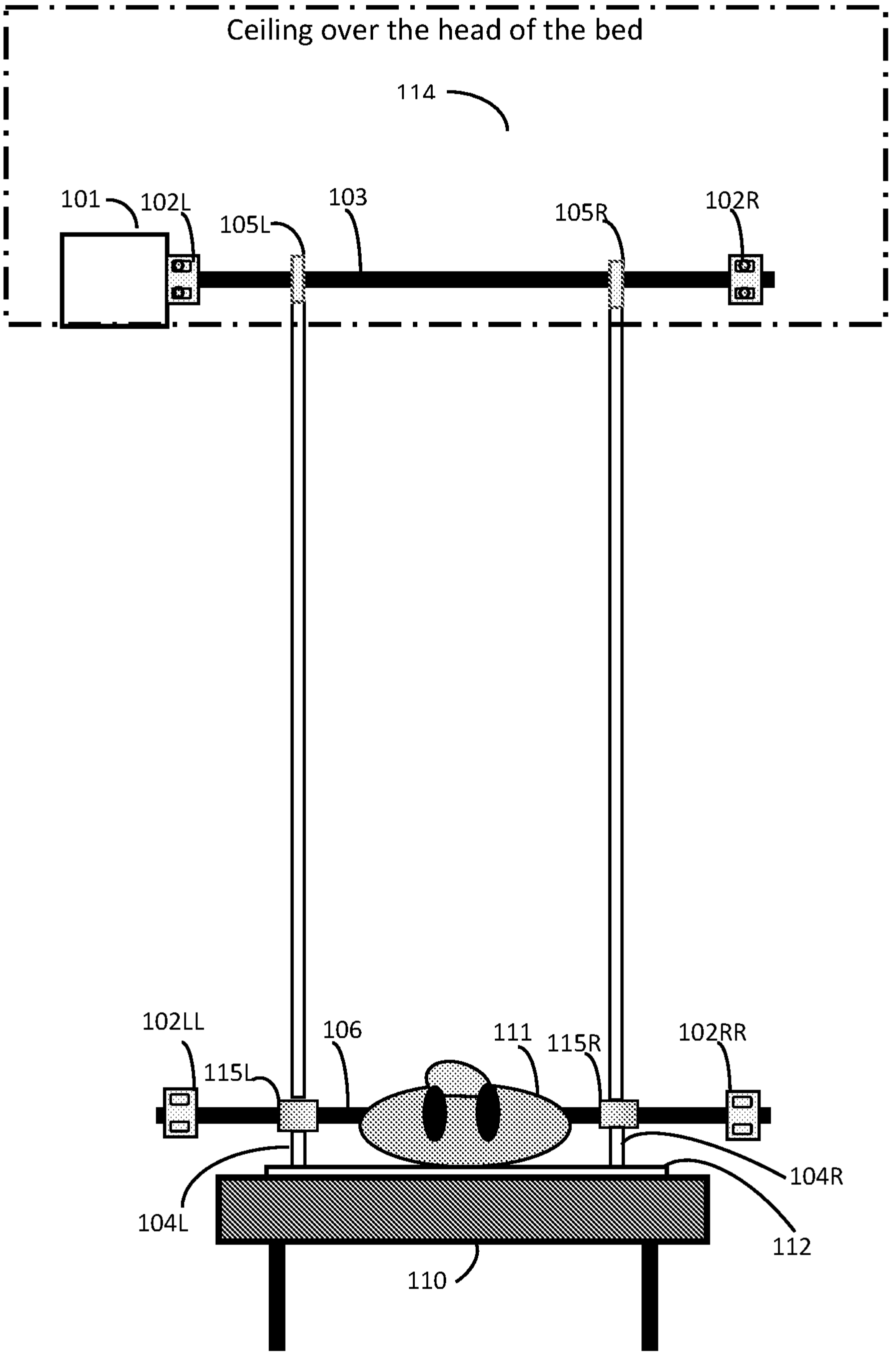

FIG. 1B is another embodiment where the patient puller motorized unit and the rotating pull rod are fixed to the ceiling above the heads of the bed with a pulley system at the level of the patient enabling conversion of a vertical pull force to a horizontal pull force to move the patient up on his bed when the patient puller is turned on.

Figure 1C:
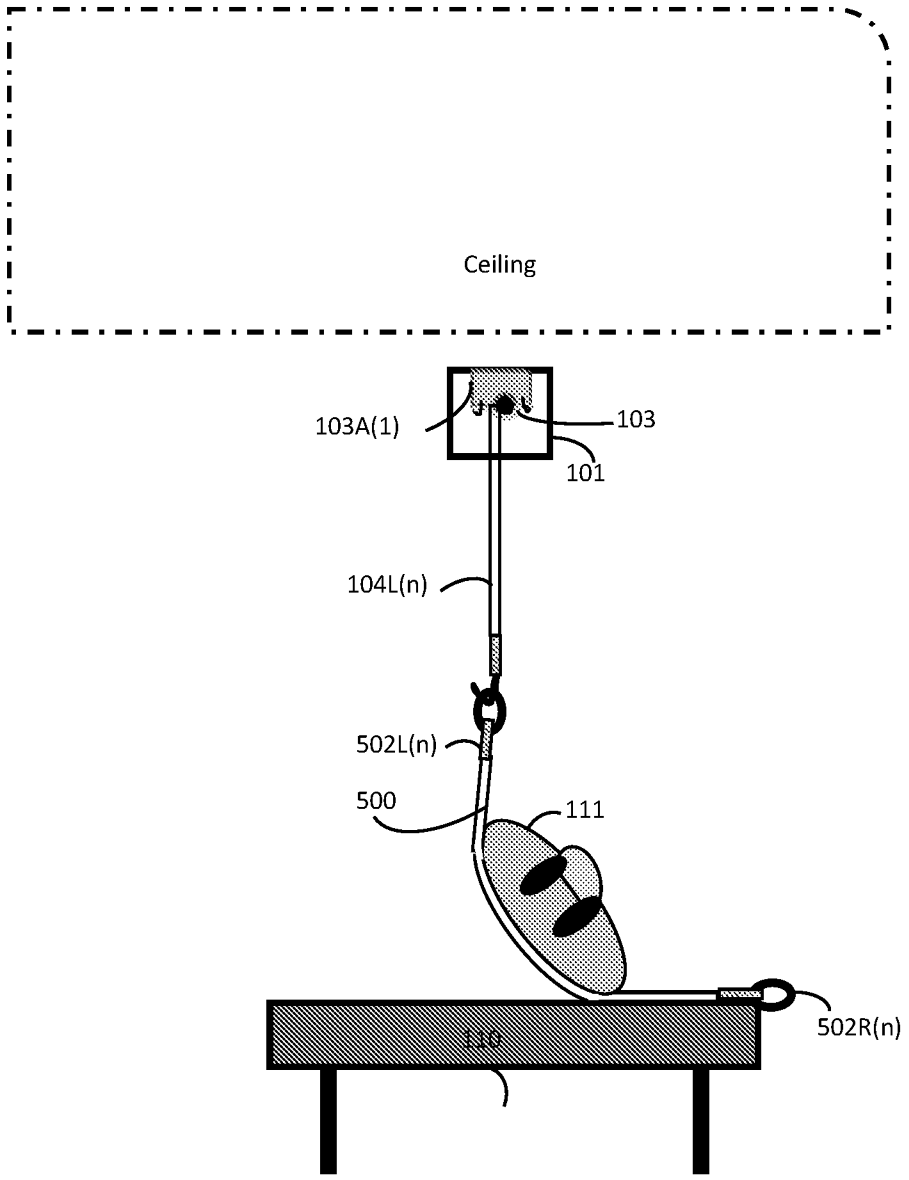

FIG. 1C—is an embodiment whereby having a pull rod parallel to the patient on top of the bed allows the patient to be turned on the sheet. Frequent turning of the patient is necessary to prevent bedsores and providing comfort to the patient. This can also help during washing and cleaning of the patient and changing bed clothes.

Figure 2:
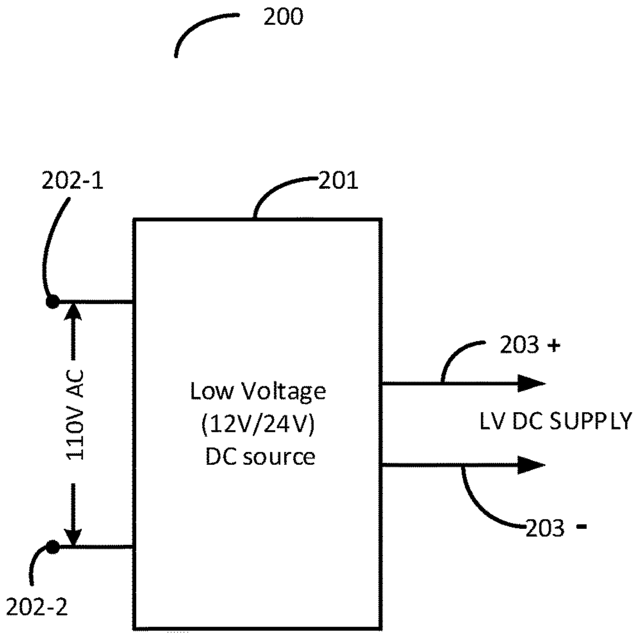

FIG. 2—is a block schematic of the motor, the power supply within the motor housing 101 of FIG. 1

Figure 3:
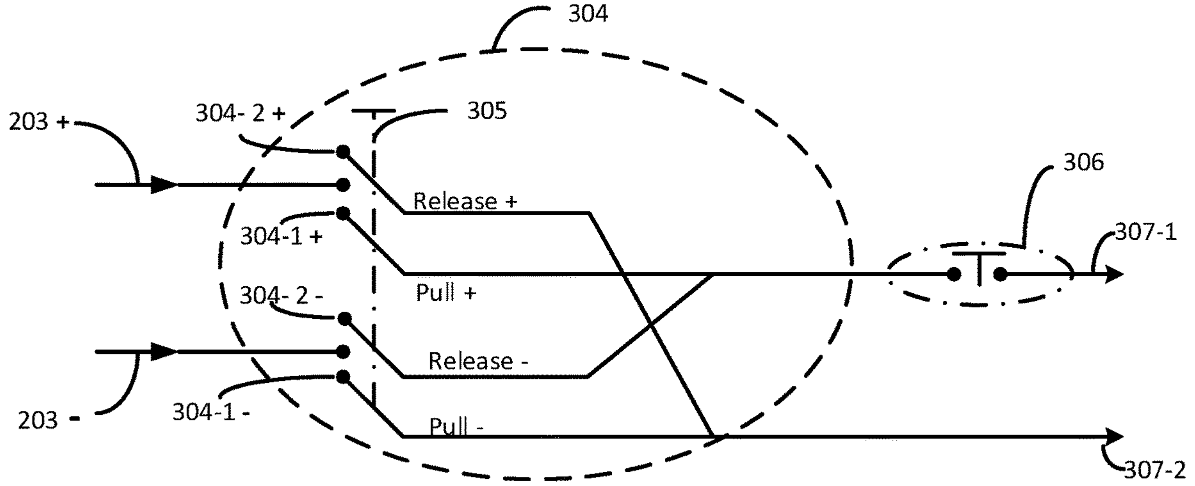

FIG. 3—is a schematic diagram of the switches (Pull-off-Release and safety switches) contained within the motor housing 101 of FIG. 1

Figure 4:
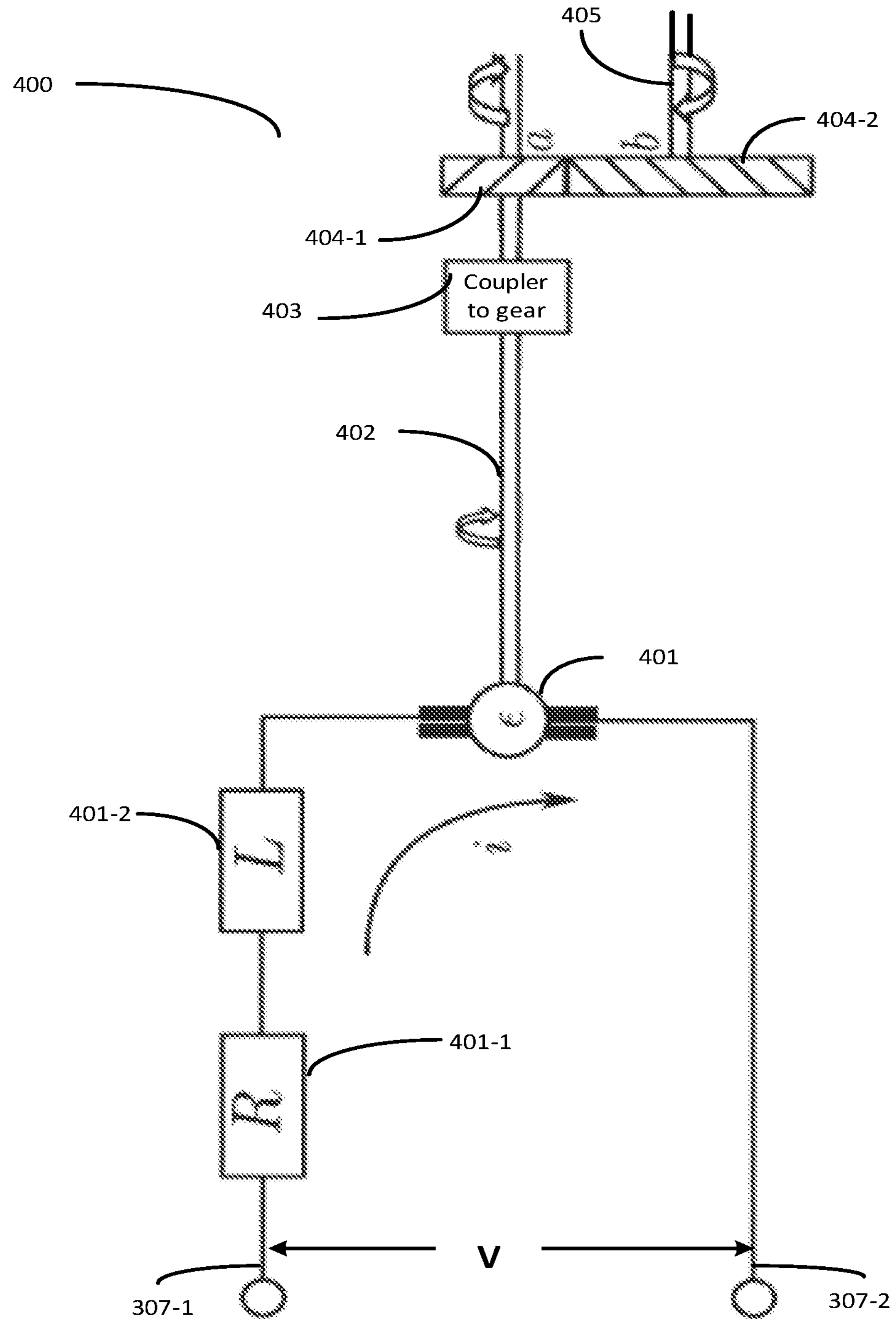

FIG. 4 is the connection diagram for the motor with gears.

Figure 5A:
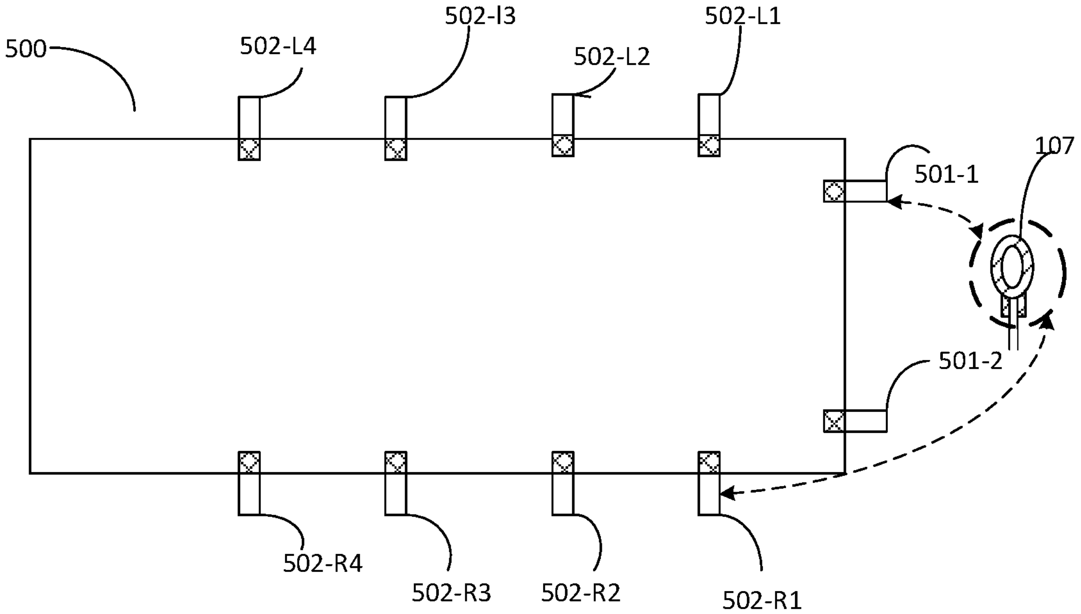

FIG. 5A—is an exemplary layout of an embodiment of the pull-up slide sheet.

Figure 5B:
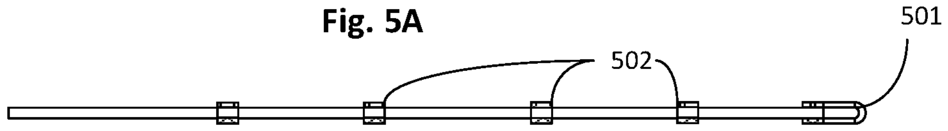

FIG. 5B—is an exemplary side view of the layout of the embodiment of the pull-up slide sheet in FIG. 5A.

Figure 6A:
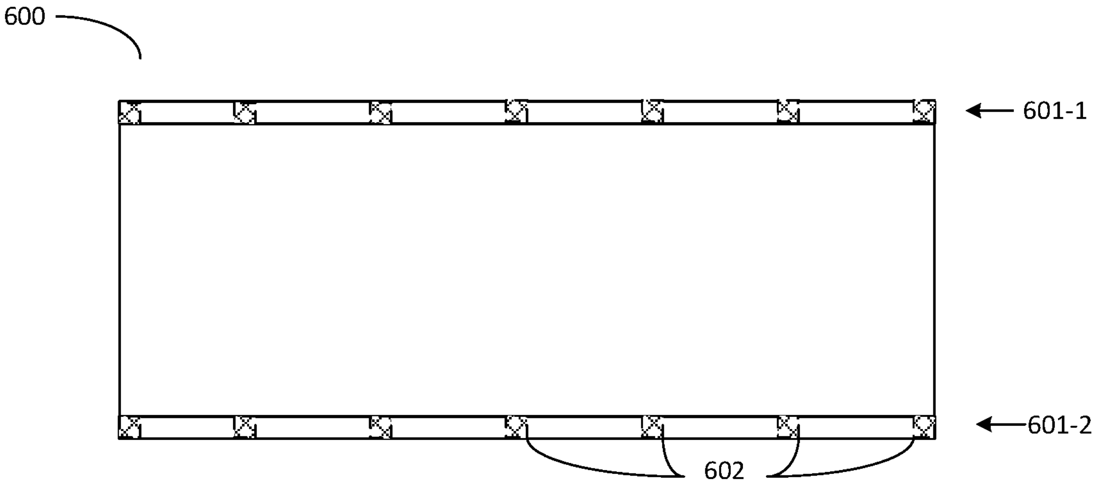

FIG. 6A—is another exemplary layout of an embodiment of the pull-up slide sheet.

Figure 6B:
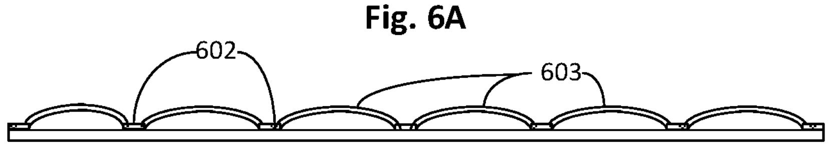

FIG. 6B—is another side view of the layout of the embodiment of the exemplary pull-up slide sheet in FIG. 6A.

SUMMARY OF APPLICATION

In an embodiment of the application a patient puller apparatus for pulling a patient horizontally on a bed is described, the apparatus having a slide sheet on the bed for a patient to lie on having a low friction coating on its underside, the slide sheet having a plurality of loops on its sides, equidistant from its center line where the patient is to be. Two or more pull-straps having a first end and a second end with clips attached to the first end are provided and the clips during use are for attaching the first end of the pull-strap to one of a pair of the plurality of loops on the slide sheet.

A pull rod located substantially at the level of the patient on the bed, typically at the head of the bed, to reduce the force needed to pull the patient horizontally up the bed is attached to a motor system configured to rotate the pull rod in a pull direction when a pull-release switch that controls the motor of the motor system is turned to a pull position. The second end of the pull-straps attached to the pull rod and the pull rod rolls and pulls the slide sheet and the patient horizontally on the bed when the pull-release switch is turned on to the pull position by pulling and rolling up the pull-straps attached to it on to the pull rod. The rolling pull rod pulls and rolls up the pull-straps attached to it to exert the necessary pull force on the slide sheet via the connected pull-straps to move the patient horizontally on the bed.

The motor system is enclosed in a motorized puller box enclosure that encloses a reversible electric motor, a power supply, the gear system and the rotating spindle coupled to a reduction gear system for outputting the rotating torque output from the motor system. The gear system consists of a gear box that drives the rotating spindle which is coupled to the pull rod and transfer the rotational torque of the motor to the spindle A coupler is used to couple the spindle to the pull rod and transfer the rotational torque of the spindle to the pull rod.

The direction of rotation of the motor, in the pull direction or the release direction is controlled by a DPDT pull-release switch which has a pull position, and off position and a release position. The pull-reverse switch that allows the motor to operate to rotate the pull rod in a pull direction when the switch is set to a pull position or to rotate the pull rod in a release direction that is opposite the pull direction when the pull-release switch is set to a release position.

A second safety switch which is typically a push button switch is provided that can be used to turn on or off the rotation of the motor in typical implemented embodiment.

The slide-sheet has long sides and short sides and equal number of pairs of loops are attached to the sides of the sheet on either side of the patient position on the sheet on the bed to enable uniform pull force on either side of the sheet when any pair of loops are used to attach the sheet to the pull rod. The slide sheet loops can be individually attached to the slides of the slide sheet or formed as part of a long tape attached at different locations along the sides of the slide sheet. When the long tape is used, the long tape portions between the attachment locations provide the loop capability. When the loops attached to the slide sheet are connected to the pull rod by clips on the pull-straps, the loop positions are chosen, typically as pairs on opposite sides of the patient, to enable uniform pull force to be applied on both sides of the patient on the slide sheet.

In one embodiment the pull rod is attached to the bed and is located substantially at the level of the patient on the bed. In another embodiment the pull rod is attached at to a wall at the head of the bed and attachment is substantially at the level of the patient on the bed. In a third embodiment the pull rod and the motor system are attached to the ceiling over the head of the bed and a pulley system with pullies at the level of the patient is used to convert a vertical force of pull on the pull straps connected to the pull rod to a horizontal force by passing the pull-straps over the pullies of the pulley system to enable the patient to be pulled horizontally on the bed using the slide sheet.

In yet another embodiment the patient puller fixed to the bed or to the ceiling, if fixed with the pull rod substantially along the center of the bed, will also be helpful in turning the patient on the bed with limited effort on the side of the carte giver. The side loops on one side of the slide sheet can be used to connect to the pull rod to apply a vertical lift force that can be used to turn the patient to the side opposite to the one on which the vertical lift force is applied.

DETAILS OF THE APPLICATION

A pulling mechanism using a motor, and a rolling tube or rod of sufficient strength to pull a patient lying on a sheet on the bed is provided to move patients up the bed with little manual effort. In most hospitals and care facilities a common problems is that patients tend to slip down the beds causing discomfort for the patient. Patients have to be moved-up to comfortable position on the bed. Currently this is done manually by two nursing staff one on either side of the bed, with the patient on a slide sheet and pulling the patient manually up using the slide sheet. This simple but strenuous operation has been the cause of back problems for many nursing staff. The current invention is a way to reduce or eliminate this injury to nursing staff by mechanizing the pull-up operation.

The patient puller is automated helper device that allows a caregiver to pull up a patient lying on a bed to a comfortable position without exertion of too much effort and without being in a position to hurt himself or herself.

FIG. 1 is a block diagram 100 of the system for the pulling up a patient 111 lying on a bed 110. It consists of a patient puller motorized unit 101 with a rotating pull rod 103 with capability to be attached to the bed 110 by clamping units 102L and 102R. Though the unit is shown clamped to the bed in FIG. 1, it is not supposed to be limiting. The system may be made stand-alone and movable where needed. The motorized unit container 101 comprise a motor, the power supply and the necessary switches for their operation. The pull-rod 103 is connected to a rotating shaft 405 driven by the motor within the motorized unit 101. The pull-rod 103 has at least two straps 104L and 104R attached to it at 105L and 105R as shown. These straps 104L and 104R roll up on the pull-rod 103 as the pull-rod 103 rolls. The straps have metal clips 106L and 106R attached to their ends. In operation these clips 106L and 106R get attached to loops 107L1 and 107R1 at the ends of straps 108L1 and 108R1 stitched on at 109L1 and 109R1 respectively to a pull-sheet 112 on the bed 110. Alternate connections are possible at the loops 107L2 and 107R2 at the ends of straps 108L2 and 108R2 stitched on at 109L2 and 109R2 respectively to a pull-sheet 112. The patient 111 is shown lying on the pull-sheet 112 with his/her head on a pillow 113. In the preferred case the pull-sheet 112 has a low friction backing to allow the sheet to be pulled-up easily.

FIG. 1A shows an embodiment where the patient puller motorized unit 101 with the rotating pull rod 103 is attached to the side wall 113 at the head of the bed instead of directly to the bed 110. The attachment to the wall of the pull rod being spaced away from the wall to allow for the pull straps 104 L and 104R to roll on to the pull rod 103 without constraint.

FIG. 1B is another embodiment where the patient puller motorized unit 101 with the rotating pull rod 103 is attached to the ceiling above the head of the bed with a pulley system comprising the rod 106 fixed to the bed using attachments 102LL and 102RR with pullies 115R and 115L at the level of the patient and the pull straps 104L and 104R passing through the pullies to connect to and roll up on the pull rod 103 attached to the ceiling. The ceiling attachment being spaced off the ceiling to provide the capability for the pull straps 104L and 104R to roll on to the pull rod 103 without constraint. The pulley system enable the vertical pull force exerted through the pull straps by the motor to be converted to a horizontal force to move the patient horizontally up his bed when the patient puller is used.

FIG. 1C is an embodiment that allows the apparatus 100 to be used as a patient turner enabling the patient to be turned on his bed by the care giver, to reduce incidence of bed sores, for changing bed clothes and patient cleaning. In this case the motorized unit 101 with the rotating pull rod 103 is attached to the bed or ceiling parallel to the long side of the bed, with the pull rod running along the center of the bed. By attaching the pull straps 104, (n) or 104R(n) (one of (n) possible straps is seen as example in FIG. 1C) to the side loops 502-L(n) or R(n) (one of many shown on any one side, left or Right of the sheet 500 shown in FIGS. 5A and 5B). When the pull-reverse switch is turned on, the pull rod 103 turns to roll up the pull straps 104 L(n) shown attached to the pull rod, pulling up the side of the sheet as shown in FIG. 1C helping to turn the patient. In the FIG. 1C the patient puller/turner apparatus is shown attached to the ceiling using stand off blocks 103A and not to the bed. The stand off block 103A allows the pull straps 104 L/R(n) to be rolled on to the pull rod 103 without any restriction.

As disclosed earlier attaching the patient puller/turner to the, bed, side wall or ceiling is useful in hospital/patient rooms where space is a premium.

FIG. 2 is a schematic 200 of the DC power supply and the FIG. 3 is the Pull-Off-Reverse and safety switch schematic for the patient puller of FIG. 1.

FIG. 2 shows an AC to DC converter 201 having an AC input of typically 110 V between the input terminals 202-1 and 202-2 which is converted to a low voltage (LV) direct current (DC) supply needed to drive the DC motor as an output between terminals 203+ and 203−.

FIG. 3 shows the switch schematic of the Patient puller. The Low Voltage (LV) DC output across 203+ and 203− is fed into to a Pull-Off-Release (on-off-on) (SPDT) switch the connection schematic of which is shown as FIG. 3. The switch schematic 304 is shown as a three position switch having a first terminal 304-1+ and 304-1− which is wired to provide a pull voltage enabling the correct pull rotation to the motor, a third switch position 304-2+ and 304-2− which is wired to reverse the inputs 203+ and 203− to provide a reverse DC supply voltage at the output, that enable to reverse the motor spin direction. A central second position isolates both inputs 203+ and 203− with no supply to the terminals 304. The switch positions are set by the switch actuator 305.

An optional second switch 306 in series with one of the output terminal is used as an additional protection. Preferably this is a SP-DT or push button switch based on the user's convenience. The final derived outputs to be fed to the motor terminals are at the terminals 307-1 and 307-2

FIG. 4 is a schematic 300 of the low voltage DC motor with gear train used in the exemplary implementation of patient puller 100. Though a DC motor 400 is shown, it is not meant to be limiting. Other types of motors can be used to achieve the needed implementation as is well understood by the electrical and mechanical engineering community. The input voltage is supplied at the motor terminals connected in series with the LV DC output 307-1 and 307-2. When the Pull-Off-Release switch 304 is set to connect to the contacts 304-1+ and 304-1− respectively are motor will roll in one direction due to the torque generated at the armature 410 due to its interaction with the magnetic field of the motor. The internal impedance of the motor is shown as the combination of resistance R 401-1 and the inductance L 401-2. The rotation speed of the motor is transferred to a gear system 404-1 and 404-2 coupled to the axil 402 of the motor to reduce the rotational speed to a manageable speed using a coupler 403. The reduced rotational speed is transferred to the pull rod 405 to pull up the patient on the bed.

FIG. 5A shows an exemplary modified pull-up slide sheet 500, modified with loops 501-1 and 501-2 attached on the top and loop pairs 502-*na* to 502-*nb* attached to the two sides of the slide sheet. In the figure shown n=1 to 4 (not to be considered limiting) as there are four pairs of loops distributed on the either sides of the sheet for connection using pull clamps/metal clips 1061 and 106 R at the ends of pull-straps (pull-tapes) 104L and 104 R attached to the rotating pull-rod to pull the patient lying on the sheet 500 up as discussed previously. FIG. 5B is aside view of the sheet in FIG. 5A FIGS. 6A and 6B are layout and side views respectively of another modified slide-sheet 600 with a long tape 601-1 and 601-2 attached at locations 602 at intervals along the two sides of a slide sheet with loops 603 of the long tape 601 between the attached locations 602, that allow the pull clamp to be attached for pulling up the sheet and the patient.

Though the sheet modifications are mainly meant for patient pull up on a bed, another use of the sheet with the side loops is to make it easy to turn the patient with the patient pull up system attached to a ceiling or using another lifting mechanism such as a Hoya lift that can be attached to the loops to lift up the edge/side of the sheet and make it easier to turn a patient on the sheet.

A set of 5 photographs showing an exemplary implementation of the invention is enclosed as APPENDIX A Photograph p-4 shows a patient puller with the enclosure, the switches, the pull rod with pull-straps attached to a patient's bed ready for checking and proof of concept.

Even though the exemplary implementations are shown as a patient puller fixed to the head of the bed, this implementation is not meant to be limiting in any way. The patient puller may be implemented even as a mobile system on a movable frame that can be brought and attached to the bed as and when needed for use. The system may be supplied in a kit form for assembly by the user on the beds as part of the movable implementation. The frame can also be made manually or automatically movable to improve transportability. In locations or patient rooms where floor space is minimum, the patient puller may be attached to the side wall at an appropriate height or attached to the ceiling with a fixed or pull-down capability In case the patient puller is attached directly to the ceiling, it is possible to have the pulley system that is adjustable attached or coupled the head of the bed which will convert a vertical pull to a horizontal pull for pulling up the patient on the slide-sheet. These and other implementation methods that will be easily understood and implementable by the users of the patient puller are all covered by this application. Such a system can be implemented with adjustable pullies that can be lowered and fixed at the appropriate height from the ceiling, in order to avoid taking up space at the head of the bed. These and other optimum implementation methods for the patient puller will be understandable to the users depending on their need, location and space availability. All such modifications are covered anticipated and covered by this application.

It is to be understood that the present disclosure of implementation is exemplary and susceptible to various modifications and alternative forms. Some representative embodiments have been shown by way of example in the drawings and have been described in detail herein. However, the invention is not intended to be limited to the particular forms disclosed. Rather, the disclosure is to cover all modifications, equivalents, and alternatives falling within the spirit and scope of the invention as defined by the claims.

What is claimed is:

1. A system for pulling up a patient up towards a head-side on a bed, the system comprising:

a sheet configured to receive a patient lying thereon, with a patient's head configured to rest at the head-side of the bed and a patient's feet configured to rest at a foot-side of the bed;

the sheet on which the patient is lying is a slide-sheet having an underside which is made slidable to reduce friction;

the slide-sheet comprising a plurality of loops at least on a head-side of the slide-sheet corresponding to the head-side of the bed;

a mechanized setup comprising a motor system within an enclosure with switch connections, gears, and at least a coupler to couple the motor system to a pull-tube or pull-rod;

the motor system attached parallel to the head-side of the bed, the motor system attached to a wall, ceiling, or bedframe, with the pull-tube or pull-rod parallel to the head-side of the bed;

at least a couple of pull-straps;

the at least the couple of pull-straps each having a first end attached to one of the plurality of loops on the head-side of the slide-sheet and a second end of the at least the couple of pull-straps attached to the pull-tube or pull-rod to apply a pull force on the head-side of the slide-sheet on the bed with the patient lying on the slide-sheet;

wherein the first end of the at least the couple of pull-straps attached to the at least the couple of the plurality of loops are attached to loops spaced equally from the center of the head-side of the slide-sheet;

wherein the head-side of the bed and slide-sheet is the side of the bed and slide-sheet where the patient's head rests on the bed and slide-sheet, and is opposite and away from the side of the bed and slide-sheet where the patient's feet rest; and wherein when the pull-tube or pull-rod rolls, the pull-tube or pull-rod rolls up the at least the couple of pull-straps and is configured to pull up the patient horizontally up on the bed towards the head-side of the bed without manual effort; and wherein the switch connections comprise connection to a pull-release switch and to a safety press-on switch, wherein the pull-release switch has to be set to the pull or release position and the safety switch has to be held pressed for the motor to operate, thereby providing an additional safety to the patient during operation of the system.

2. The system of claim 1, wherein the plurality of loops are placed spaced equidistant from the patient, on the head-side of the slide-sheet to allow equal pull on the slide-sheet when the at least the couple of pull straps connected to the couple of the plurality of loops on the slide-sheet are rolled up by the pull-rod.

3. The system of claim 1, wherein a long tape attached at intervals along the sides of the slide-sheet forms the plurality of loops for attachment of the at least the couple of pull straps on either side of the slide-sheet to allow equal pull on the slide-sheet when the pull straps are rolled up by the pull-rod or pull-tube.

4. The system of claim 1, wherein the mechanized setup comprising the motor system, the pull-tube or pull-rod, the slide-sheets with loops and the pull straps are suppliable in kit form to users to set up the patient puller system.

5. The system of claim 3 wherein the loops are individually attached to the slide-sheet or formed as part of a long tape attached at different locations along the sides of the slide-sheet with the long unattached tape portions between the attachment locations providing a capability for attachment as loops for clips at the first end of the at least the couple of pull straps.

6. The system of claim 5, wherein the loops connected to the pull rod by clips on the first end of the at least the couple of pull-straps are chosen to enable a uniform pull on both sides of the slide-sheet during the pull up of the patient towards the head-side of the bed.

7. The patient turner system of claim 1, wherein having the plurality of loops on the long sides of the sheet distributed at equal distance enable a uniform vertical force to be applied to the sheet by the plurality of pull straps when the pull rod attached above and parallel to the patient position rolls and provides a vertical pull up of the side of sheet.

8. The patient turner apparatus of claim 1, wherein the plurality of loops are individually attached to the long sides of the sheet or formed as part of a long tape attached at different locations along each of the long sides of the sheet with the unattached tape portions between the attachment locations forming the plurality of loops providing a capability for attachment for the clips at the first ends of the plurality of pull straps.

9. A system for turning a patient lying on a sheet on a bed, the system comprising:

a mechanized setup, comprising a motor system, the motor system further comprising an enclosure with a motor, gears, switches, and at least a coupler to couple the motor system to a pull-tube or pull-rod attached to a ceiling or a bedframe, above and parallel to a patient position, along the center of the bed, the motor system configured to apply a pull-force, on one side of the sheet on the bed, pulling up that side of the sheet with the patient lying on the sheet, the pull force being applied by having one end of each of a plurality of pull straps attached to a one of a plurality of loops along one side of the sheet and the other end of each of the plurality of pull straps attached to the pull-tube or pull-rod attached above and parallel to the patient position;

wherein when the pull-tube or pull-rod rolls, the pull-tube or pull-rod rolls-up the ends of the plurality of pull straps attached to the pull-tube or pull-rod, applying the pull force on one side of the sheet, pulling up that one side of the sheet and turning the patient on the bed to the other side of the bed, without manual effort; and wherein the plurality of loops on the sheet comprises a first plurality of loops on a first side and a second plurality of loops on a second side of the sheet, the first and second sides being parallel to the patient on the bed, each of the plurality of loops configured to be attached to one of the plurality of pull straps and configured to turn the patient on the sheet on the bed to either side, the patient being turned to the side opposite the side of the sheet the pull straps are attached to on the sheet to apply the pull force; and wherein the switches comprise a pull-release switch and a safety press-on switch, wherein the pull-release switch has to be set to the pull or release position and the safety switch has to be held pressed for the motor to operate, thereby providing an additional safety to the patient during operation of the system.

10. The system of claim 9, wherein the plurality of loops are placed equidistant on the long sides of the sheet parallel to the patient to allow equal pull on the sheet when the plurality of pull straps are rolled up by the pull-tube or pull-rod, helping to turn the patient on the bed.

11. The system of claim 9, wherein long tapes attached at intervals along the first and the second sides of the sheet form the first and second plurality of loops for attachment of the pull straps on any one side of the sheet to allow equal pull on the side of the patient on the sheet;

wherein when the pull straps are rolled up by the pull-rod or pull-tube attached above the patient, parallel to the position of the patient on the sheet, the system helps to turn the patient on the bed.

12. The system of claim 9, wherein the mechanized setup comprising the motor system, the pull-tube or pull-rod, the sheet with loops and the pull straps are suppliable in kit form to users to set up the patient turner system.

13. A patient turner apparatus for turning a patient on a bed, the apparatus comprising:

a sheet on the bed for a patient to lie on;

the sheet having a plurality of loops on its two long sides;

a plurality of pull-straps having a first end and a second end with clips attached to the first end;

the clips configured for attaching each of the first end of the plurality of pull-straps to one of the plurality of loops on one side of the sheet on the bed;

a pull rod attached to a motor system configured to rotate the pull rod in a pull direction when a pull-release switch is turned to a pull position and a safety switch is held depressed;

the second end of the plurality of pull-straps configured to be attached to the pull rod; the patient turner apparatus attached to a ceiling above the center of the bed with the pull rod parallel to the patient and a long side of the bed;

wherein the pull rod is configured to roll and provide a vertical pull up of the side of sheet attached to the pull rod via the attached plurality of pull-straps; and wherein the vertical pull up of the side of the sheet enabling the care giver to turn the patient on the bed on his or her side.

* * * * *